Patented Aug. 13, 1929.

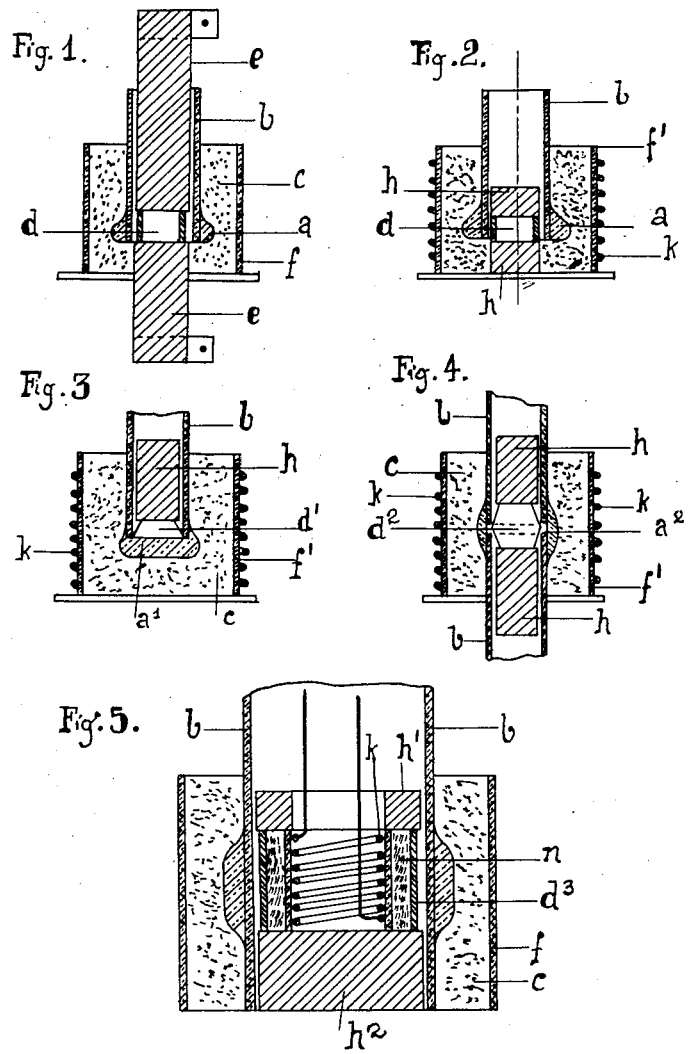
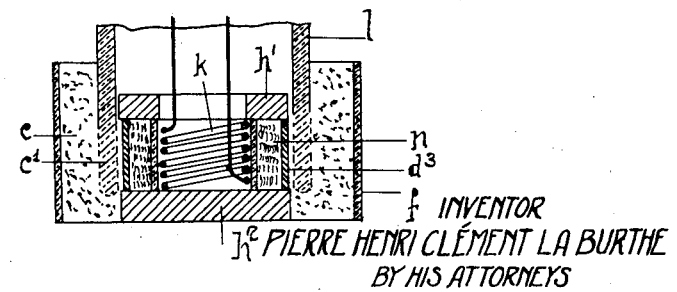

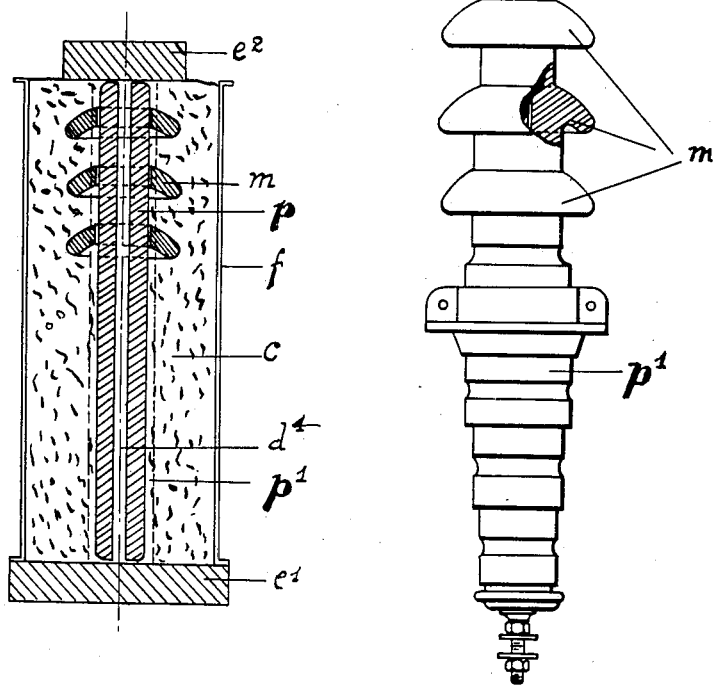

1,724,844

UNITED STATES PATENT OFFICE.

PIERRE HENRI CLÉMENT LA BURTHE, OF NEMOURS, FRANCE, ASSIGNOR TO SOCIÉTÉ "QUARTZ L SILICE," OF PARIS, FRANCE, A CORPORATION OF FRANCE.

PROCESS FOR THE MANUFACTURE OF ARTICLES OF SILICA GLASS BY ADDITION OF MATERIAL.

Application filed February 19, 1927, Serial No. 169,573, and in France February 24, 1926.

The present invention has for its object a process allowing alterations to the shapes, dimensions and characteristics of existing articles made of silica glass, by adding silica with a view to producing a completely homogeneous structure by the integral welding together of the original article and the addition.

This process consists in effecting complete fusion of pulverulent silica in the immediate vicinity of the part or parts of the silica glass article or articles, to be treated, by heating this pulverulent silica as well as the silica glass part or parts to be treated, in such a way as to obtain an intimate welding of this added silica to the silica glass article or articles.

By way of example, it is possible by this process to add an end or bottom to a tube so as to convert it into a vase, to apply an increase of thickness over the whole or part of an article, to fit collars upon tubes, and to connect two tubes together end to end.

This same process can be applied to the manufacture of silica glass articles of large dimensions in successive elements, with addition of material in gradual stages.

The articles obtained by this process present the following advantages over those obtained by the customary methods employing the arc and the blowpipe:

(1) Since the welding is effected by a complete refusion of the articles, the weld properly speaking does not exist and there is nothing to distinguish the original article from the added material fused on to it.

(2) Since all the parts of the weld are heated simultaneously, there exists in the article obtained after cooling no internal stress or tension analogous with those observed where the welding is effected in the ordinary manner.

The invention comprises also apparatus allowing of carrying out this process, as well as the novel industrial products obtained thereby.

The accompanying drawing represents, but only by way of example, some forms of construction of apparatus serving for carrying out the process according to the invention, the parts being shown in central vertical section, partly in elevation.

Figure 1 represents the fitting of a collar $a$ upon a tube $b$ made of fused silica; for this purpose the tube $b$ is surrounded externally with pulverulent silica $c$ packed into casing $f$. The portion of the mass of pulverulent silica which is to serve to form the collar $a$, and also the part of the tube $b$ upon which the latter is to be welded, are heated by radiation from a heating element $d$ placed in the interior of the tube $b$ facing the position at which the weld is to be effected; this element $d$ is raised to the desired temperature by the passage of an electric current of suitable voltage and amperage conveyed to the resistance element $d$ by leads $e$. The casing $f$ serves to hold the pulverulent silica $c$ in place.

Figure 2 represents a modified apparatus, in which the element $d$ is heated by high-frequency induction by the passage of primary currents through a coil $k$ arranged outside the casing $f^1$; the parts $h$ placed inside the tube $b$ above and below the heating element $d$ serve merely as heat-insulation.

In the arrangement according to Figure 3, the heating element $d^1$ has a shape adapted to cause the fusion of a zone of the pulverulent silica charge $c$ such that it constitutes an end or bottom $a^1$ for the tube $b$.

Figure 4 represents an arrangement, analogous to the foregoing ones in the case of the welding together end to end of two tubes $b$—$b$ by adding at the part $a^2$ pulverulent silica subjected to fusion. The heating element is indicated at $d^2$.

The apparatus represented in Figure 5 allows of increasing the thickness of a tube $b$, for the whole of its length if desired, by a progressive displacement of the tube and the heating element relatively to one another. The heating element $d^3$ is placed outside the high frequency primary coil $k$ and is insulated to prevent the escape of heat by filling up with suitable material at $n$ and by the parts $h^1$, $h^2$.

Figure 6 represents the application of the present process to the manufacture of a silica ferrule $l$ of large diameter, in successive elements with gradual addition or building up of material. The heating device is arranged as in the case of Figure 5. There is first of all produced an initial cylindrical element or section of the ferrule by fusion of that part of the charge of pulverulent silica $c$ which is in contact with the heating element $d$. The initial cylindrical element may be formed by any convenient means for instance by the process described in Patent No. 1,612,628, granted Dec. 28th, 1926, to Henri George. The first section thus formed is raised relatively to the heating device into the position shown in full lines; the operation is continued by melting the region $c^1$ of the charge of pulverulent silica which becomes welded intimately to the section of the ferrule $l$ already formed, and so on; there can in this way be obtained articles of any desired length.

Figures 7 and 8 represent the application of this process to the manufacture of bell insulators, this example serving to illustrate the most general case of the manufacture of articles by means of concentric elements made of silica.

Fig. 7 represents, in section, the apparatus utilized for welding a number of bells or flanges $m$ upon a hollow body $p$. The latter is arranged inside the casing $f$ and is packed round with pulverulent silica $c$, the bells $m$ being placed in position upon the body or core $p$ in turn as the pulverulent silica is filled into the casing.

A heating element $d^4$, located in the central bore of the hollow body $p$, is raised to the necessary temperature by the passage of an electric current, which is supplied to it through metal conductors $e^1$ and $e^2$. The heat radiated by this heating element $d^4$ causes the melting of a cylindrical mass of silica $p^1$ all along this element. When the molten zone extends as far as the internal edges of the bells $m$, the latter are thereby united in a homogeneous mass with the central core $p$. By reason of this fusion, the diameter of the body or core $p$ may at the same time be increased by addition of molten material.

The article thus obtained can then be machined by the process described in the United States Letters Patent No. 1,583,229 issued May 4, 1926, in order to receive its final shape as represented in Figure 8.

As a modification of this process, the hollow body or core surrounding the element or electrode $d^4$ may be omitted, the bells $m$ being simply laid in position in the charge of pulverulent silica. The charge, in melting around the electrode, will be caused to weld the several bells together and thus to constitute finally the insulator to be obtained.

What I claim is:

1. A process for the manufacture of fused silica articles of diverse shapes by adjunction of material to a previously formed silica member, consisting in packing pulverulent silica around said member, and in heating the parts of said member where said adjunction of material is to be caused, together with the adjacent parts of pulverulent silica which has been packed about said member, to a temperature adapted to cause the complete fusion of the said parts of the silica member and of the said parts of pulverulent silica and to ensure an intimate welding of both parts.

2. A process for the manufacture of fused silica articles of diverse shapes by adjunction of material to a previously formed silica member, consisting in packing pulverulent silica around said member, and in heating the parts of said member where said adjunction of materials is to be caused, together with the adjacent parts of pulverulent silica which has been packed about said member, by electrical means, to a temperature adapted to cause the complete fusion of the said parts of the silica member and of the said parts of pulverulent silica and to ensure an intimate welding of both parts.

3. A process for the manufacture of fused silica glass articles of diverse shapes by adjunction of material to a previously formed tubular silica glass member, consisting of placing said member in contact with a mass of pulverulent silica, and of heating parts of said member, from within the same, together with the adjacent parts of the mass of pulverulent silica, in the zone of adjunction of material, to a temperature adapted to cause the complete fusion of said parts of the silica glass member and of the mass of pulverulent silica and to ensure an intimate welding of both parts.

4. A process for the manufacture of fused silica glass articles of diverse shapes by adjunction of material to a previously formed tubular silica glass member, consisting of placing said member in contact with a mass of pulverulent silica, and of heating parts of said member, from within the same, together with the adjacent parts of the mass of pulverulent silica, in the zone of adjunction of material, to a temperature adapted to cause the complete fusion of the silica glass member and of the mass of pulverlent silica and to ensure an intimate welding of both parts, and in progressively displacing the previously formed tubular silica glass member and the heating means relatively to each other for the purpose described.

In testimony whereof I have signed my name to this specification.

PIERRE HENRI CLÉMENT LA BURTHE.